United States Patent
Yoneyama (12)

(10) Patent No.: US 6,210,295 B1
(45) Date of Patent: *Apr. 3, 2001

(54) GOLF BALL HAVING COATED SURFACE LAYER OF POLYURETHANE

(75) Inventor: Naohiro Yoneyama, Koga (JP)

(73) Assignees: Tohpe Corporation, Sakai; Yokohhama Rubber Co., Ltd., Tokyo, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,971

(22) Filed: Nov. 19, 1997

(30) Foreign Application Priority Data

Nov. 21, 1996  (JP) ........................................... 8-310697

(51) Int. Cl.$^7$ ............................ A63B 37/12; C08G 18/46; C08G 18/50; C08G 18/63
(52) U.S. Cl. ........................... 473/378; 473/351; 528/75; 528/76; 528/80; 528/85
(58) Field of Search ..................................... 473/351, 378; 528/75, 76, 80, 85

(56) References Cited

U.S. PATENT DOCUMENTS 5,461,109 * 10/1995 Blair et al. ............................ 524/839
5,817,735 * 10/1998 Hatch et al. ............................ 528/84
5,820,491 * 10/1998 Hatch et al. ........................... 473/378
5,830,938 * 11/1998 St. Laurent et al. ................. 524/317
5,840,788 * 11/1998 Lutz et al. ............................. 524/95
6,096,851 *  8/2000 Maruoka et al. ....................... 528/85

FOREIGN PATENT DOCUMENTS 63-164966  7/1988 (JP) .
1-141677  6/1989 (JP) .
5269221  10/1993 (JP) .

* cited by examiner

Primary Examiner—Rabon Sergent
(74) Attorney, Agent, or Firm—Armstrong, Westerman, Hattori, McLeland, & Naughton, LLP

(57) ABSTRACT

A golf ball having an outermost layer of a coating film formed from a polyurethane clear top coat comprising (A) a polyol component containing a polyurethane polyol having terminal hydroxyl groups and urethane bonds in the main chain thereof, said polyurethane polyol being formed from a diisocyanate compound and a hydroxyl group-containing compound and having a hydroxyl value of 20 to 100 mgKOH/g when the non-volatile content is 100% by weight, a concentration of urethane group of 1 to 5 millimoles/g and a weight average molecular weight of 10,000 to 50,000, and (B) a yellowing resistant polyisocyanate, wherein the NCO/OH equivalent ratio is from 0.7/1.0 to 2.0/1.0. The golf ball has excellent scratch resistance, weatherability and surface durability, and the golf ball which is hard to generate scratch, face cuts and cracks when struck with an iron club can be produced in good coating workability.

13 Claims, No Drawings

GOLF BALL HAVING COATED SURFACE LAYER OF POLYURETHANE

BACKGROUND OF THE INVENTION

The present invention relates to a golf ball which has excellent scratch resistance and ultraviolet ray resistance, in addition to an excellent surface durability whereby generation of face marks by striking with an iron club is decreased, and which is prepared in good coating workability.

Wound golf balls and solid golf balls such as two piece balls are known, wherein a cover made of balata rubber or a thermoplastic resin such as ionomer resin is provided on a core. In both wound golf balls and solid golf balls, paints for golf balls are coated on the surface of the cover in plural layers. In general, such a coating film comprises a bottom layer of a white undercoat paint, one or more intermediate layers of a white intercoat and an outermost layer (surface layer) of a clear top coat.

The functions of the coating film constituting the outermost layer are to impart a gloss to balls to present a fine appearance and to protect the cover. Paints for golf balls used for forming such an outermost layer are required to have properties such as flexibility of coating film which can follow stretch and shrink resulting from deformation of golf balls by external force added when struck, impact resistance which is endurable an impact by a club head, and weatherability which is endurable the use in the outdoors. Also, a good coating workability is required. For example, a two component polyurethane paint is required to have such a coating workability that after mixing two components to form a coating liquid, it has generally a coatable time, namely a pot life, of about 5 hours, and after applying the coating liquid onto golf balls, a time until the coating liquid becomes the state that dust cannot stick, namely dust free drying time, is as short as possible.

Two component polyurethane paints have been conventionally used as paints satisfying such requirements to some extent, e.g., a two component polyurethane paint composed of a polyester polyol or polyether polyol and a polyisocyanate, a two component polyurethane paint composed of an acrylic polyol and a polyisocyanate, and a two component polyurethane paint composed of a polycarbonate diol and a polyisocyanate. However, no paint satisfying all the above-mentioned requirements has been proposed.

Two component polyurethane paints wherein a polyester polyol is used as the polyol component are excellent in film strength, but they have a high hardness and are also inferior in impact resistance and weatherability. Thus, it has also been attempted to use a polyester polyol having a low hydroxyl value or to decrease the amount of a polyisocyanate, thereby lowering the crosslinking density to soften the resulting coating film. These attempts improve the flexibility or softness of the coating film to some extent, but cause another problems that the scratch resistance is lowered and the drying velocity is decreased. A difficulty to improve the weatherability also arises.

In Japanese Patent Publication Kokoku No. 6-93930, it is proposed to use, as a paint for golf balls, a two component polyurethane paint comprising a diisocyanate of non-yellowing type and a hydroxyl group-containing polyester obtained by a reaction of a polycarboxylic acid and a polyhydric alcohol component containing a polyhydric alcohol having an isocyanurate ring. This paint has good surface durability such as scratch resistance and impact resistance, but has a problem that the weatherability is poor.

Two component polyurethane paints wherein a polyether polyol is used as the polyol component have the advantage that coating films having good flexibility and weatherability are easy to be obtained, but have the disadvantage that the scratch resistance is poor. Thus, it is proposed to introduce a rigid group such as aromatic group into the polyether polyol molecular chains, or to further use an active hydrogen compound in order to raise the crosslinking density. It is possible to contemplate an improvement of scratch resistance by these methods, but they cause a problem that the obtained coating films are difficult to follow the stretch and shrink caused by deformation of golf balls at the time of impact, thus being poor in impact resistance.

Two component polyurethane paints wherein an acrylic polyol is used as the polyol component are excellent in weatherability and film strength, but have the disadvantage that the hardness is high and the impact resistance is poor. Thus, it is proposed to use an acrylic polyol having a lower Tg and a low hydroxyl value, or to decrease the amount of a polyisocyanate, or to combine these manners, thereby lowering the crosslinking density to soften the resulting coating film. The flexibility of coating films is improved to some extent by these methods, but a problem of deterioration in scratch resistance arises.

In order to solve the problems as mentioned above of conventional paints for golf balls, Japanese Patent Publication Kokai No. 1-141677 proposes to use, as the golf ball paint, a two component polyurethane paint comprising a polycarbonate diol as the polyol component. This paint has good weatherability and film strength and has also good scratch resistance and impact resistance, and exhibits better properties than those of conventional paints for golf balls. However, it still has a slow drying problem that the dust free drying time is long. If a curing catalyst such as dibutyl tin dilaurate is used in order to shorten the dust free drying time, there arises a problem that the pot life becomes short.

Like this, known golf balls have the problems as mentioned above in the coating films formed on the surface of cover and cannot satisfy all the properties required such as impact resistance, scratch resistance and weatherability. Also, there is a problem of workability in coating golf balls with paints. Thus, it is demanded to develop a golf ball which can satisfy all the properties required for golf ball and can be produced in good coating workability.

It is an object of the present invention to provide a golf ball which can satisfy all properties required for golf balls such as flexibility, film strength and surface durability.

A further object of the present invention is to provide a golf ball having on the surface of a cover a coating film having excellent properties such as scratch resistance, impact resistance, weatherability, flexibility, film strength and elasticity and capable of being formed in good coating workability.

Another object of the present invention is to provide a two component polyurethane paint having excellent properties such as scratch resistance, impact resistance, weatherability, flexibility, elasticity and film strength and having a long pot life and a shortened tack-free or dust-free drying time, and being suitable as a paint for golf balls.

These and other objects of the present invention will become apparent from the description hereinafter.

SUMMARY OF THE INVENTION

In accordance with the present invention, there is provided a golf ball having an outermost layer of a coating film formed from a polyurethane clear top coat comprising:

(A) a polyol component containing a polyurethane polyol having terminal hydroxyl groups and urethane bonds in the main chain thereof, said polyurethane polyol being formed from a diisocyanate compound and a hydroxyl group-containing compound and having a hydroxyl value of 20 to 100 mgKOH/g when the non-volatile content is 100% by weight, a concentration of urethane group of 1 to 5 millimoles/g and a weight average molecular weight of 10,000 to 50,000, and (B) a yellowing resistant polyisocyanate as a hardener, wherein the NCO/OH equivalent ratio of isocyanate group in said component (B) to hydroxyl group in said component (A) is from 0.7/1.0 to 2.0/1.0.

The golf ball of the present invention can be prepared in good coating workability, and has excellent properties such as film strength, elasticity, flexibility, impact resistance, scratch resistance and weatherability. In particular, the golf ball of the invention has excellent scratch resistance and ultraviolet ray resistance, and in addition thereto, it has both high film strength and proper elasticity and, therefore, has an excellent surface durability which remarkably decreases generation of face marks such as face cuts by striking with an iron club.

DETAILED DESCRIPTION

The golf ball of the present invention comprises a non-coated golf ball body comprising a core and a cover provided thereon, and a coating film comprising a plurality of layers the outermost layer (surface layer) of which is formed from a specific polyurethane clear top coat. The clear top coat used to form the outermost layer comprises (A) a polyol component containing a polyurethane polyol which has been produced from a diisocyanate compound and a hydroxyl group-containing compound and which has urethane bonds in the main chain thereof and hydroxyl groups at the chain ends and has a hydroxyl value of 20 to 100 mgKOH/g when the non-volatile content is 100% by weight, a concentration of urethane group of 1 to 5 millimoles/g and a weight average molecular weight of 10,000 to 50,000, and (B) a yellowing resistant polyisocyanate as a hardener, wherein the NCO/OH equivalent ratio of isocyanate group in said component (B) to hydroxyl group in said component (A) is from 0.7/1.0 to 2.0/1.0.

Since the outermost layer of the coating film provided on the golf ball body is formed from the specific polyurethane clear top coat, the golf ball of the present invention is excellent in properties required for the golf ball coating film, e.g., flexibility, impact resistance, scratch resistance and weatherability such as ultraviolet ray resistance, and also can be prepared in good coating workability. Since the golf ball of the present invention has a high surface durability, face marks generated by frictional impact between the golf ball surface and the face of an iron club when struck with the club can be reduced.

The non-coated golf ball used in the present invention is not particularly limited, and any of known golf balls prior to coating a paint onto the surface of the golf ball body can be used, such as wound golf balls and two piece solid golf balls having a cover of an ionomer resin or a balata rubber on a core (wound core in case of the wound golf balls). The golf ball body is coated with an undercoat paint such as a white undercoat paint, and optionally with an intercoat such as a white intercoat to form at least one intermediate layer. The undercoat paint and intercoat used in the present invention can be those conventionally used, and are preferably those having some degrees of elongation, elasticity and plasticity. Further, preferred is an undercoat paint having a good interlaminar adhesion to both the non-coated golf ball body and the intercoat layer. Also preferred is an intercoat having a good interlaminar adhesion to the top coat layer of the polyurethane clear top coat according to the present invention. Further, it is preferable that the undercoat paint, the intercoat and the polyurethane clear top coat are selected so that the elongations of the coating films formed from them increase in the order of the undercoat, intercoat and top coat layers, since the coating films are easy to follow the stretch and shrink resulting from the deformation of golf ball by external force applied when struck by a club, thereby imparting a good impact resistance.

In the present invention, the outermost layer is formed from the above-mentioned polyurethane clear top coat on the golf ball coated with an undercoat paint and preferably further with an intercoat.

The thickness of the outermost layer (top coat layer) can be a generally adopted thickness for the top coat of golf balls, and is from 15 to 25 $\mu$m, preferably 20 to 25 $\mu$m. If the top coat layer is too thin, the strength at break and impact absorbing performance of the top coat are decreased, so there arises a case that sufficient performances such as surface durability (reduction of face marks) and scratch resistance are not obtained. If the top coat layer is too thick, the drying property of the coating film is lowered and the dimples in the surface of the golf ball body tend to be filled up with the paint to lower the basic performances of the golf balls.

In the present invention, the polyol component (A) used in the polyurethane clear top coat for forming the outermost layer contains as an essential component a specific polyurethane polyol made from a diisocyanate compound and a hydroxyl group-containing compound.

Examples of the diisocyanate compound used for preparing the specific polyurethane polyol are, for instance, hexamethylene diisocyanate (HDI), xylylene diisocyanate (XDI), hydrogenated xylylene diisocyanate ($H_6XDI$), isophorone diisocyanate (IPDI), tetramethylxylylene diisocyanate (TMXDI), hydrogenated diphenylmethane diisocyanate ($H_{12}MDI$), and other aliphatic, alicyclic and aromatic diisocyanate compounds. These exemplified diisocyanate compounds are preferred from the viewpoint of the weatherability.

Examples of the hydroxyl group-containing compound used for preparing the specific polyurethane polyol are, for instance, low molecular weight diols or triols, e.g., ethylene glycol, diethylene glycol, triethylene glycol, butylene glycol, 1,3-butanediol, 1,4-butanediol, neopentyl glycol, 1,6-hexanediol, glycerol, trimethylolpropane and hexanetriol; and macro polyols (high molecular weight polyol compounds), e.g., a polyether polyol such as polyoxypropylene glycol, polyoxyethylene glycol, polyoxytetramethylene glycol or a copolymer of the above-mentioned oxyalkylene compound, a polyester polyol such as a polycondensation product of a dicarboxylic acid and a glycol or a ring-opening polymerization product of an $\epsilon$-caprolactone, a polycarbonate polyol, a polyolef in polyol such as polybutadiene polyol, hydrogenated polybutadiene polyol or polyisoprene polyol, and an epoxypolyol. Polyether polyol and polycarbonate polyol are preferred from the viewpoints of weatherability, hydrolysis resistance and flexibility. The molecular weight of the macro polyol is preferably from 500 to 5,000, especially 1,000 to 2,000.

The polyurethane polyol made from the diisocyanate compound and the hydroxyl group-containing compound contains urethane bonds in the main chain thereof and hydroxyl groups at the chain ends, and has hydroxyl value of 20 to 100 mgKOH/g, preferably 30 to 80 mgKOH/g, more preferably 40 to 65 mgKOH/g, when the non-volatile content is 100% by weight, a concentration of urethane group of 1 to 5 millimoles/g, preferably 1 to 4 millimoles/g, more preferably 2 to 3.5 millimoles/g, and a weight average molecular weight of 10,000 to 50, 000, preferably 10,000 to 4 0,000, more prefarably 11,000 to 27,000. If the hydroxyl value of the polyurethane polyol is less than 20 mgKOH/g, the molecular weight of the coating film formed is easy to increase, but, because of low hydroxyl value, the hardness of the coating film becomes low and the scratch resistance or the breaking strength is lowered. If the hydroxyl value is more than 100 mgKOH/g, the molecular weight of the coating film formed is hard to increase and the hardening becomes slow. Further, because the crosslinking density becomes high, the elongation at break and the impact resistance of the coating film are lowered. If the urethane group concentration is less than 1 millimole/g, the characteristics peculiar to urethane resins such as flexibility and abrasion resistance are hard to be obtained, and if it is more than 5 millimole/g, the viscosity increases and, therefore, a solvent as a thinner must be used in an increased amount, so the solid content of the obtained paint is decreased and a desired film thickness is hard to be obtained when applied in a usual coating manner such as air spraying or electrostatic spraying. Further, if the weight average molecular weight of the polyurethane polyol is less than 10,000, the drying property is lowered and the coating films formed are hard to reveal a sufficient strength, and if it is more than 50,000, no practical application property is obtained.

The polyol component (A) used in the present invention may contain other polyols than the above-mentioned polyurethane polyol, e.g., known polyols such as commercially available acrylic polyols, polyester polyols and polyether polyols, which have a good miscibility. Acrylic polyols and polyether polyols are preferred from the viewpoint of the weatherability, and acrylic polyols are particularly preferred further from the viewpoint of the surface drying property.

In order to maintain the effects produced by the specific polyurethane polyol such as impact resistance, scratch resistance, abrasion resistance, weatherability and coating workability, it is preferable to use the specific polyurethane polyol in an amount of at least 30% by weight, especially at least 50% by weight, based on the total weight of the polyols used.

Examples of the yellowing resistant polyisocyanate (B) used as the hardener in the clear top coat for forming the outermost layer of the golf ball of the present invention are, for instance, hexamethylene diisocyanate (HDI), xylylene diisocyanate (XDI), hydrogenated xylylene diisocyanate ($H_6XDI$), isophorone diisocyanate (IPDI), tetramethylxylylene diisocyanate (TMXDI), hydrogenated diphenylmethane diisocvanate ($H_{12}MDI$), and prepolymers prepared from these diisocyanate compounds. The polyisocyanate compounds may be used alone or in admixture thereof. Examples of the prepolymers are, for instance, trimethylolpropane(TNIP)-modified hexamethylene diisocyanate, isocyanurate-modified hexamethylene diisocyanate, biuret-modified hexamethylene diisocyanate, trimethylolpropane-modified isophorone diisocyanate, isocyanurate-modified isophorone diisocyanate, and other known modified isocyanate compounds.

It is preferable to use the polyol component (A) and the isocyanate component (B) in a proportion such that the equivalent ratio of isocyanate group in (B)/hydroxyl group in (A) is from 0.7/1.0 to 2.0/1.0, especially 0.9/1.0 to 1.7/1.0, more especially 1.0/1.0 to 1.7/1.0, from the viewpoints of drying property, breaking elongation, plasticity and elasticity of the coating film.

The polyurethane clear top coat used in the present invention may contain additives generally used in golf ball paints such as silicone slipping agent, levelling agent, viscosity controller, fluorescent whitening agent, antiblocking agent, organic solvent for dilution and curing catalyst in amounts generally adopted.

The golf ball of the present invention is prepared by applying the polyurethane clear top coat comprising the polyol and polyisocyanate components (A) and (B) as mentioned above onto the surface of a coating film such as an intercoat on a golf ball body to form the outermost layer. The method for applying the clear top coat is not particularly limited, and the application can be conducted in a conventional manner such as air spraying, electrostatic spraying and dipping.

Since the polyurethane polyol prepared from a hydroxyl group-containing compound such as polyether polyol or polycarbonate diol by using a diisocyanate compound is used in the polyol component, a large number of urethane bonds are introduced into the main chain of the polyurethane produced from such a polyol component (A) and the polyisocyanate component (B). Since the outermost layer is made of a coating film of such a polyurethane, the golf ball of the present invention has good properties required for the golf ball surface such as flexibility, elasticity, strength, durability, scratch resistance, abrasion resistance and weatherability. Further, since the polyurethane clear top coat has good pot life and drying property, the golf ball can be prepared in a good coating workability.

In a preferable embodiment of the present inveniton, the polyurethane clear top coat comprises (A) a polyol component containing 30 to 100 parts by weight of the above-mentioned specific polyurethane polyol and 70 to 0 parts by weight of other polyol such as an acrylic polyol or a polycarbonate diol, and based on 100 parts by weight of the total of the polyols, 0 to 0.5 part by weight of a curing catalyst and 0 to 2.0 parts by weight of a silicone assistant, and (B) a yellowing resistant polyisocyanate in an NCO/OH equivalent ratio of 1.0/1.0 to 1.7/1.0. The polyol component (A) may further contain 0 to 1.0 part by weight of a fluorescent whitening agent. The outermost layer of the coating film formed from such a polyurethane clear top coat is provided on wound golf balls and two piece golf balls.

The present invention is more specifically described and explained by means of Examples, in which all % and parts are by weight unless otherwise noted. It is to be understood that the present invention is not limited to these Examples.

EXAMPLES 1 TO 6 AND COMPARATIVE EXAMPLES 1 TO 5

Clear top coats for golf balls were prepared by mixing the ingredients shown in Table 1, namely a polyol, a hexamethylene diisocyanate derivative, dibutyl tin dilaurate as a curing catalyst and others, in amounts shown in Table 1.

The detail of the ingredients shown in Table 1 is as follows:

Polyurethane polyol I: polycarbonate polyol in the form of varnish commercially available under the trade mark "Takelac XE-75-K-22" made by Takeda Chemical Industries, Ltd. and having a non-volatile content of 50%, a hydroxyl value of 46.6 mgKOH/g when the non-volatile content is 100%, a urethane group concentration of 2.5 millimoles/g and a weight average molecular weight of 13,000

Polyurethane polyol II: polyether polyol in the form of varnish commercially available under the trade mark "Takelac XE-75-K-12" made by Takeda Chemical Industries, Ltd. and having a non-volatile content of 50%, a hydroxyl value of 59.9 mgKOH/g when the non-volatile content is 100%, a urethane group concentration of 3.2 millimoles/g and a weight average molecular weight of 24,000

Acrylic polyol III: acrylic polyol in the form of varnish commercially available under the trade mark "Acrydic A-819" made by Dainippon Ink and Chemicals, Inc. and having a non-volatile content of 55% and a hydroxyl value of 54.5 mgKOH/g when the non-volatile content is 100%

Polyester polyol IV: polyester polyol in the form of varnish commercially available under the trade mark "Nippolan 192" made by Nippon Polyurethane Industry Co. Ltd. and having a non-volatile content of 80% and a hydroxyl value of 138 mgKOH/g when the non-volatile content is 100%

Polyether polyol V: polyether polyol commercially available under the trade mark "P-1000" made by Asahi Denka Kogyo Kabushiki Kaisha and having a non-volatile content of 100% and a hydroxyl value of 110 mgKOH/g Polycarbonate diol VI: polycarbonate diol commercially available under the trade mark "Nippolan 982N" made by Nippon Polyurethane Industry Co. Ltd. and having a non-volatile content of 100% and a hydroxyl value of 56 mgKOH/g Silicone assistant: trade mark "Paintad M" made by Dow Corning Asia Kabushiki Kaisha Thinner: mixed solvent for dilution prepared in accordance with the resins used in Examples and Comparative Examples from xylene, toluene, ethyl acetate, butyl acetate, methyl ethyl ketone, methyl isobutylketone, cyclohexanone and propylene glycol monomethyl ether acetate Hexamethylene diisocyanate derivative: isocyanurate-modified hexamethylene diisocyanate commercially available under the trade mark "Takenate D-170N" made by Takeda Chemical Industries, Ltd. and having an NCO content of 21% and a non-volatile content of 100%

A white undercoat paint commercially available under the trade mark "GB Primer Y" made by Tohpe Corporation was applied to a two piece golf ball having a cover made of an ionomer resin so as to give a film having a thickness of 5 to 10 μm, and was dried at 50° C. for 24 hours. Onto the undercoat was applied a white intercoat commercially available under the trade mark "GB White Y" made by Tohpe Corporation so as to give a film having a thickness of 10 to 15 μm, and was dried at 50° C. for 24 hours. The previously prepared clear top coat paint was applied onto the intercoat film so as to give a film having a thickness of 18 to 23 μm, and was dried at 50° C. for 24 hours and allowed to stand at room temperature for 2 weeks to give golf balls.

The obtained golf balls were evaluated with respect to the surface durability, scratch resistance, ultraviolet ray resistance and tackiness of golf balls after drying according to the following methods. Also, the change in viscosity of the obtained top coat paints was measured according to the following method.

The results are shown in Table 2.

Surface Durability

A No. 7 iron club was attached to a swing robot machine made by Kabushiki Kaisha Miyamae, and a golf ball was struck 35 times at a head speed of 35 m/second. The surface appearance of the golf ball was visually observed and evaluated according to the following criteria.

○: Face marks (surface cuts) generated by frictional impact between the surface of golf ball and the club face are few, thus the surface condition is good.

Δ: A few more face marks (surface cuts) are observed, thus the surface condition is slightly inferior.

X: Face marks (surface cuts) are many, thus the surface condition is bad.

Scratch Resistance

In a 4 liter ceramic pot were placed 1.8 kg of emery and 10 golf balls. The pot was placed on a ball mill frame and rotated for 150 minutes. The golf balls taken out of the pot was lightly washed with water by using a sponge and the water on the surface was wiped off with a cloth. The state of the coating film was visually observed and evaluated according to the following criteria.

○: There are only a few scratches on 10 golf balls and the surface condition is good.

Δ: A few more scratches are observed, thus the surface condition is slightly inferior.

X: Scratches are many, thus the surface condition is bad.

Ultraviolet Ray Resistance

A half of a golf ball was covered with an aluminum foil, and the golf ball was placed at a distance of 30 cm from a bactericidal lamp so that the non-covered surface is faced to the lamp. After the exposure for 24 hours, the hue of each of the exposed and non-exposed portions was measured by a spectroscopic color difference meter model SZ-Σ 80 made by Nippon Denshoku Kogyo Kabushiki Kaisha. The ultraviolet ray resistance was evaluated according to the following criteria.

○: Color difference ΔE between the exposed portion and the non-exposed portion is not more than 1.

Δ: Color difference ΔE between the exposed portion and the non-exposed portion is more than 1 and not more than 3.

X: Color difference ΔE between the exposed portion and the non-exposed portion is more than 3.

Tackiness of Golf Ball After Drying

The tackiness of the surface of the dried golf ball was evaluated by finger touch according to the following criteria.

○: There is little tackiness.

Δ: There is a little tackiness.

X: The tackiness is large.

Change in Viscosity of Paint

The viscosity (falling time) of the prepared paint was measured by an efflux cup (Iwata cup) at 20° C. immediately after the preparation thereof and after 5 hours.

TABLE 1

| Ingredients (part) | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|
| Polyol component (A) | | | | | | | | | | | |
| Polyurethane polyol I | 100 | 50 | — | 40 | 25 | 36 | — | — | — | — | — |
| Polyurethane polyol II | — | — | 78 | 38 | 25 | — | — | — | — | — | — |
| Acrylic polyol III | — | 45.5 | 20 | 20 | 45.5 | 58.2 | 90.9 | — | — | — | — |
| Polyester polyol IV | — | — | — | — | — | — | — | 62.5 | — | — | — |
| Polyether polyol V | — | — | — | — | — | — | — | — | 50 | — | — |
| Polycarbonate diol VI | — | — | — | — | — | — | — | — | — | 50 | 50 |
| Dibutyl tin dilaurate | 0.03 | 0.03 | 0.03 | 0.03 | 0.03 | 0.03 | 0.03 | 0.03 | 0.03 | 0.03 | 0.5 |
| Silicone assistant | 0.1 | 0.1 | 0.1 | 0.1 | 0.1 | 0.1 | 0.1 | 0.1 | 0.1 | 0.1 | 0.1 |
| Methyl ethyl ketone | — | 2.4 | 1 | 1 | 2.4 | 2.4 | 4 | 10 | 15 | 15 | 15 |
| Ethyl acetate | — | — | — | — | — | — | — | 10 | 10 | 10 | 10 |
| Propylene glycol monomethyl ether acetate | — | 2 | 0.9 | 0.9 | 2 | 2 | 4 | 10 | 10 | 10 | 10 |
| Xylene | — | — | — | — | — | 1.3 | 1.0 | 7.4 | 14.9 | 14.9 | 14.9 |
| Hardener component (B) | | | | | | | | | | | |
| Hexamethylene diisocyanate derivative | 9.1 | 9.9 | 11.6 | 10.5 | 10.6 | 10.1 | 10.7 | 27.0 | 21.6 | 19.6 | 19.6 |
| Thinner | 150 | 150 | 150 | 150 | 150 | 150 | 150 | 150 | 150 | 150 | 150 |
| Characteristics of component (A) | | | | | | | | | | | |
| Non-volatile content (%) (≈) | 50 | 50 | 50 | 50 | 50 | 50 | 50 | 50 | 50 | 50 | 50 |
| Hydroxyl value when non-volatile content is 100% (mgKOH/g) (≈) | 46.6 | 50.4 | 58.8 | 53.2 | 53.8 | 51.7 | 54.5 | 138 | 110 | 56 | 56 |
| NCO/OH equivalent ratio (≈) | 1.1 | 1.1 | 1.1 | 1.1 | 1.1 | 1.1 | 1.1 | 1.1 | 1.1 | 1.1 | 1.1 |

TABLE 2

| | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 |
|---|---|---|---|---|---|---|---|---|---|---|---|
| Surface durability | ◯ | ◯ | ◯ | ◯ | ◯ | Δ | X | X | X | Δ | ◯ |
| Scratch resistance | ◯ | ◯ | ◯ | ◯ | ◯ | Δ | Δ | Δ | X | ◯ | ◯ |
| Ultraviolet ray resistance | ◯ | ◯ | ◯ | ◯ | ◯ | ◯ | ◯ | X | ◯ | ◯ | ◯ |
| Tackiness after drying | ◯ | ◯ | ◯ | ◯ | ◯ | ◯ | ◯ | Δ | X | Δ | ◯ |
| Viscosity of paint (second) | | | | | | | | | | | |
| Initial | 9.5 | 9.4 | 9.2 | 9.1 | 9.2 | 9.0 | 8.4 | 8.0 | 7.4 | 8.7 | 8.7 |
| After 5 hours | 11.5 | 11.6 | 11.1 | 11.0 | 11.0 | 10.9 | 8.9 | 8.7 | 7.7 | gel-lation | gel-lation |

EXAMPLES 7 TO 14 AND COMPARATIVE EXAMPLES 6 TO 9

The polyol component (A) and hardener (B) used in Example 2 or 3 and shown in Table 3 were mixed in the proportion shown in Table 3 so that the NCO/OH equivalent ratio of the isocyanate group in (B) to the hydroxyl group in (A) fell within the range of 0.5/1.0 to 2.5/1.0 (in case of Examples 7 to 14, from 0.7/1.0 to 2.0/1.0), to give clear top coats for golf ball.

A white undercoat paint commercially available under the trade mark "GB Primer Y" made by Tohpe Corporation was applied to the same two piece golf ball having a cover made of an ionomer resin as used in Example 1 so as to give a film having a thickness of 5 to 10 μm, and was dried at 50° C. for 24 hours. Onto the undercoat was applied a white intercoat commercially available under the trade mark "GB White Y" made by Tohpe Corporation so as to give a film having a thickness of 10 to 15 μm, and was dried at 50° C. for 24 hours. The previously prepared clear top coat was applied onto the intercoat film so as to give a film having a thickness of 18 to 23 μm, and was dried at 50° C. for 24 hours and allowed to stand at room temperature for 2 weeks to give golf balls.

The obtained golf balls were evaluated with respect to the scratch resistance and tackiness of golf balls after drying in the same manner as in Example 1.

The results are shown in Table 4.

TABLE 3

| Ingredients (part) | Ex. 7 | Ex. 8 | Ex. 9 | Ex. 10 | Ex. 11 | Ex. 12 | Ex. 13 | Ex. 14 | Com. Ex. 6 | Com. Ex. 7 | Com. Ex. 8 | Com. Ex. 9 |
|---|---|---|---|---|---|---|---|---|---|---|---|---|
| Polyol component (A) | | | | | | | | | | | | |
| Polyurethane polyol I | 50 | 50 | 50 | 50 | — | — | — | — | 50 | 50 | — | — |
| Polyurethane polyol II | — | — | — | — | 78 | 78 | 78 | 78 | — | — | 78 | 78 |
| Acrylic polyol III | 45.5 | 45.5 | 45.5 | 45.5 | 20 | 20 | 20 | 20 | 45.5 | 45.5 | 20 | 20 |
| Dibutyl tin dilaurate | 0.03 | 0.03 | 0.03 | 0.03 | 0.03 | 0.03 | 0.03 | 0.03 | 0.03 | 0.03 | 0.03 | 0.03 |
| Silicone assistant | 0.1 | 0.1 | 0.1 | 0.1 | 0.1 | 0.1 | 0.1 | 0.1 | 0.1 | 0.1 | 0.1 | 0.1 |
| Methyl ethyl ketone | 2.4 | 2.4 | 2.4 | 2.4 | 1 | 1 | 1 | 1 | 2.4 | 2.4 | 1 | 1 |
| Ethyl acetate | — | — | — | — | — | — | — | — | — | — | — | — |
| Propylene glycol monomethyl ether acetate | 2 | 2 | 2 | 2 | 0.9 | 0.9 | 0.9 | 0.9 | 2 | 2 | 0.9 | 0.9 |
| Xylene | — | — | — | — | — | — | — | — | — | — | — | — |
| Hardener component (B) | | | | | | | | | | | | |
| Hexamethylene diisocyanate derivative | 6.3 | 9.9 | 13.5 | 18.0 | 7.3 | 11.6 | 15.7 | 21.0 | 4.5 | 22.5 | 5.2 | 26.2 |
| Thinner | 150 | 150 | 150 | 150 | 150 | 150 | 150 | 150 | 150 | 150 | 150 | 150 |
| Characteristics of component (A) | | | | | | | | | | | | |
| Non-volatile content (%) (≈) | 50 | 50 | 50 | 50 | 50 | 50 | 50 | 50 | 50 | 50 | 50 | 50 |
| Hydroxyl value when non-volatile content is 100% (mgKOH/g) (≈) | 50.4 | 50.4 | 50.4 | 50.4 | 58.8 | 58.8 | 58.8 | 58.8 | 50.4 | 50.4 | 58.8 | 58.8 |
| NCO/OH equivalent ratio (≈) | 0.7 | 1.1 | 1.5 | 2.0 | 0.7 | 1.1 | 1.5 | 2.0 | 0.5 | 2.5 | 0.5 | 2.5 |

TABLE 4

| | Ex. 7 | Ex. 8 | Ex. 9 | Ex. 10 | Ex. 11 | EX. 12 | Ex. 13 | Ex. 14 | Com. Ex. 6 | Com. Ex. 7 | Com. Ex. 8 | Com. Ex. 9 |
|---|---|---|---|---|---|---|---|---|---|---|---|---|
| Scratch resistance | Δ | ○ | ○ | Δ | Δ | ○ | ○ | Δ | X | X | X | X |
| Tackiness after drying | ○ | ○ | ○ | ○ | Δ | ○ | ○ | ○ | Δ | ○ | X | ○ |

What is claimed is:

1. A golf ball having an outermost layer of a coating film formed from a polyurethane clear top coat comprising:
   (A) a polyol component containing a polyurethane polyol having terminal hydroxyl groups and urethane bonds in the main chain thereof, said polyurethane polyol being formed from a diisocyanate compound and a hydroxyl group-containing compound and having a hydroxyl value of 46.6 to 100 mgKOH/g when the non-volatile content is 100% by weight, a concentration of urethane group of 1 to 5 millimoles/g and a weight average molecular weight of 10,000 to 50,000, and
   (B) a yellowing resistant polyisocyanate, wherein the NCO/OH equivalent ratio of isocyanate group in said component (B) to hydroxyl group in said component (A) is from 0.7/1.0 to 2.0/1.0.

2. The golf ball of claim 1, wherein said polyol component (A) contains said polyurethane polyol in an amount of at least 30% by weight based on the total weight of polyols used.

3. The golf ball of claim 1, wherein said polyol component (A) is a combination of at least 30% by weight of said polyurethane polyol and at most 70% by weight of at least one other polyol selected from the group consisting of an acrylic polyol, a polyester polyol and a polyether polyol.

4. The golf ball of claim 1, wherein said yellowing resistant polyisocyanate (B) is at least one member selected from the group consisting of hexamethylene diisocyanate, xylylene diisocyanate, hydrogenated xylylene diisocyanate, isophorone diisocyanate, tetramethylxylylene diisocyanate, hydrogenated diphenylmethane diisocyanate and modified polyisocyanates derived therefrom.

5. The golf ball of claim 1, wherein said yellowing resistant polyisocyanate (B) is at least one member selected from the group consisting of hexamethylenediisocyanate, isophorone diisocyanate and modified polyisocyanate derived therefrom.

6. The golf ball of claim 1, wherein an undercoat layer is provided on a non-coated golf ball body and an intercoat layer is provided between said undercoat layer and said outermost layer.

7. The golf ball of claim 1, wherein said NCO/OH equivalent ratio is from 0.7/1.0 to 1.7/1.0.

8. The golf ball of claim 1, wherein said diisocyanate compound is a member selected from the group consisting of hexamethylene diisocyanate, xylylene diisocyanate, hydrogenated xylylene diisocyanate, isophorone diisocyanate, tetramethylxylylene diisocyanate and hydrogenated diphenylmethane diisocyanate.

9. The golf ball of claim 3, wherein the amount of said at least one other polyol is from 20 to 70% by weight based on the total weight of polyols used.

10. The golf ball of claim 3, wherein said other polyol is an acrylic polyol.

11. A golf ball having an outermost layer of a coating film formed from a polyurethane clear top coat comprising:
   (A) a polyol component containing a combination of at least 30% by weight of a polyurethane polyol having terminal hydroxyl groups and urethane bonds in the main chain thereof and at most 70% by weight of at least one other polyol selected from the group consisting of an acrylic polyol, a polyester polyol and a polyether polyol based on the total weight of polyols used, said polyurethane polyol being formed from a diisocyanate compound and a hydroxyl group-containing compound and having a hydroxyl value of 46.6 to 100 mgKOH/g when the nonvolatile content is 100% by weight, a concentration of urethane group of 1 to 5 millimoles/g and a weight average molecular weight of 10,000 to 50,000, and (B) a yellowing resistant polyisocyanate, wherein the NCO/OH equivalent ratio of isocyanate group in said component (B) to hydroxyl group in said component (A) is from 0.7/1.0 to 2.0/1.0.

12. The golf ball of claim 11, wherein said other polyol is an acrylic polyol.

13. The golf ball of claim 11, wherein said polyurethane polyol has a hydroxyl value of 46.6 to 80 mgKOH/g.

* * * * *